No. 750,151. PATENTED JAN. 19, 1904.
W. G. BEACH.
LAND ANCHOR.
APPLICATION FILED OCT. 7, 1903.
NO MODEL.
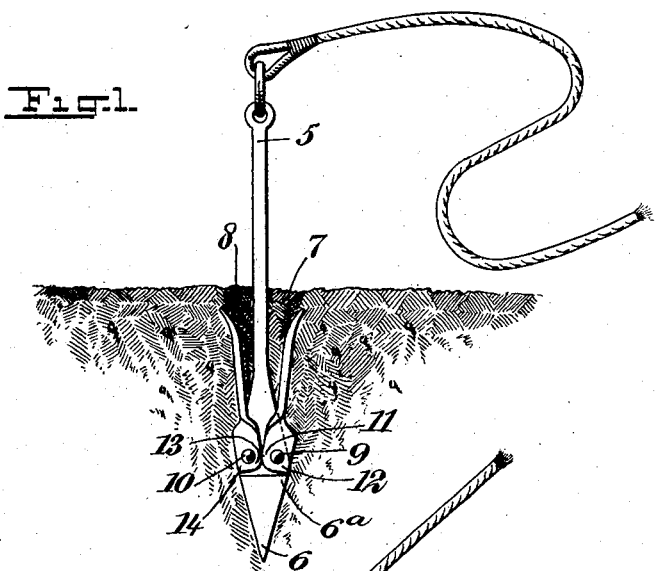
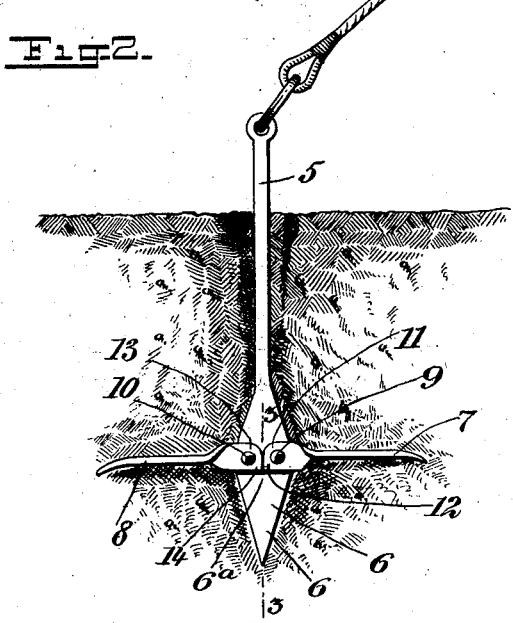
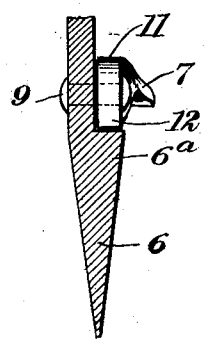
WITNESSES:
INVENTOR
William G. Beach
BY Munn & Co
ATTORNEYS No. 750,151. Patented January 19, 1904.

UNITED STATES PATENT OFFICE.

WILLIAM GASNAY BEACH, OF GRANDLAKE, ARKANSAS.

LAND-ANCHOR.

SPECIFICATION forming part of Letters Patent No. 750,151, dated January 19, 1904.

Application filed October 7, 1903. Serial No. 176,076. (No model.)

*To all whom it may concern:*

Be it known that I, WILLIAM GASNAY BEACH, a citizen of the United States, and a resident of Grandlake, in the county of Chicot and State of Arkansas, have invented new and useful Improvements in Land-Anchors, of which the following is a full, clear, and exact description.

This invention relates to a device used for the purpose of securing a rope, brace, or any similar form of supporting-wire that is arranged either vertically or at an angle with the ground and on which the tension is such as would tend to draw the end away from the ground.

The object of my invention is to provide an improved form of land-anchor in which the strain on the divergent arms is almost wholly on their supporting-pivots instead of being dependent on an adjacent part of the support as heretofore.

My invention comprehends the novel features as hereinafter set forth, and then particularly pointed out in the claims.

Reference is to be had to the accompanying drawings, forming a part of this specification, in which similar characters of reference indicate corresponding parts in all the figures.

Figure 1 is an elevation of the device in the act of being driven in the ground. Fig. 2 shows the device in use with the retaining-arms extended, and Fig. 3 is a longitudinal section through the lower portion of the device on the line 3 3 in Fig. 2.

Referring now to the accompanying drawings, the device comprises a stem or post 5, having its lower end 6 enlarged and preferably somewhat diamond-shaped, with the free end tapering to a point or knife-edge to facilitate the post being driven into the ground. Two arms 7 and 8 are separately pivoted to the end portion 6 by pivots 9 and 10, respectively. These pivots are preferably made of steel, so as to withstand the great strain that is placed upon them. Each arm comprises a flat strip that is given a bend or twist through an arc of ninety degrees adjacent the pivotal end and the free extremities are slightly bent or beveled, as shown in the several views. The pivotal end of the arm 7 has one edge 11 rounded concentric with the pivot, while the other edge 12 is left square, as shown in the figures. The arm 8 is similarly constructed with the rounded portion 13 and the squared shoulder 14. When the device is driven into the ground, the arms will be in a position adjacent the post 5 and will not interfere with the driving-act, as they will simply follow in the hole made by the end portion 6, the latter having an offset portion $6^a$, which is in alinement with the pivotal portions of the arms; but upon the post being drawn upward by the strain of the guy-rope or other means thereon the arms 7 and 8 will now diverge until they are substantially at right angles with the post, whereupon the shoulder 12 of the arm 7 will engage the corresponding shoulder 14 of the arm 8, which will effectively prevent any further swinging of the arms downward on their pivots. However, should either arm tend to swing downward before the other arm it will be brought to rest in substantially the transverse position by engagement with the offset $6^a$ until the other arm is brought to the transverse position, whereupon the said squared shoulders will be brought into engagement. From this will be seen that the strain on the arms is almost entirely on their pivotal members and not on the offset portion $6^a$. This strain is very effectually resisted by making the pivots 9 and 10 of a tough material, such as steel, as above mentioned, while the post with its offset portion $6^a$ is preferably made of a cheaper material, such as wrought-iron, that is best adapted to resist the strain of the arms.

Having thus described my invention, I claim as new and desire to secure by Letters Patent—

1. A land-anchor, comprising a post having a substantially diamond-shaped head at its lower end, the lower end of said head being pointed to penetrate the earth, an offset on one side of said head at the lower end thereof, and a pair of arms separately pivoted to said head slightly above said offset and adapted to swing upwardly into a vertical position and outwardly into a horizontal position, said arms being adapted to abut one against the other at their inner ends when brought to a horizontal position to prevent further downward movement of the arms, said arms also being curved outwardly at their free ends.

2. In a land-anchor, the combination of a post having its lower end tapered, a pair of arms separately pivoted on said end, and arranged to swing upward into alinement with the post, a shoulder on each arm, which shoulders when the arms are swung downward to a position transverse with the post will mutually engage and prevent further downward movement, and an offset portion on the post end below said arms, having a face in close proximity to said arms when they are in said mutually engaging position.

In testimony whereof I have signed my name to this specification in the presence of two subscribing witnesses.

WILLIAM GASNAY BEACH.

Witnesses:
J. H. E. ROSAMOND,
R. C. MAY.